(12) United States Patent
Eom et al.

(10) Patent No.: US 8,593,835 B2
(45) Date of Patent: Nov. 26, 2013

(54) DUTY BALANCING OSCILLATOR

(75) Inventors: Hyun-Chul Eom, Seoul (KR);
Sung-Yun Park, Bucheon (KR)

(73) Assignee: Fairchild Korea Semiconductor Ltd., Bucheon (KR)

(*) Notice: Subject to any disclaimer, the term of this patent is extended or adjusted under 35 U.S.C. 154(b) by 252 days.

(21) Appl. No.: 13/239,802

(22) Filed: Sep. 22, 2011

(65) Prior Publication Data

US 2012/0075888 A1  Mar. 29, 2012

(30) Foreign Application Priority Data

Sep. 27, 2010 (KR) .................. 10-2010-0093421

(51) Int. Cl.
*H02M 3/315* (2006.01)

(52) U.S. Cl.
USPC ............. 363/24; 363/25; 363/26; 363/21.04; 363/21.09; 363/21.1; 363/21.11

(58) Field of Classification Search
USPC ............... 363/24, 25, 26, 21.04, 21.09, 21.1, 363/21.11
See application file for complete search history.

(56) References Cited

U.S. PATENT DOCUMENTS

| | | | |
|---|---|---|---|
| 8,213,189 B2* | 7/2012 | Nishikawa | 363/21.02 |
| 8,339,813 B2* | 12/2012 | Wang et al. | 363/21.02 |
| 2009/0284991 A1* | 11/2009 | Nishikawa | 363/21.02 |
| 2010/0202167 A1* | 8/2010 | Yang | 363/26 |
| 2010/0232183 A1* | 9/2010 | Yang | 363/21.02 |
| 2011/0085354 A1* | 4/2011 | Wang et al. | 363/21.02 |

* cited by examiner

*Primary Examiner* — Bao Q Vu
(74) *Attorney, Agent, or Firm* — Okamoto & Benedicto LLP

(57) ABSTRACT

The present invention relates to an oscillator that is capable of realizing duty balancing.

The oscillator determines a switching frequency of a converter converting an input voltage according to a switching operation of switches to generate an output voltage.

The oscillator determines a first half cycle of a duty signal determining the switching frequency by using a reference current according to a feedback signal corresponding to the output voltage. The oscillator senses a first half cycle period by using an output of the frequency setting unit, and determines the same period as the first half cycle as a second half cycle of the duty signal after the first half cycle.

25 Claims, 12 Drawing Sheets

DUTY BALANCING OSCILLATOR

CROSS-REFERENCE TO RELATED APPLICATION

This application claims priority to and the benefit of Korean Patent Application No. 10-2010-0093421 filed in the Korean Intellectual Property Office on Sep. 27, 2010, the entire contents of which are incorporated herein by reference.

BACKGROUND (a) Field

Embodiments relate to an oscillator determining a switching frequency of two switches controlling an operation of a converter.

(b) Description of the Related Art

In a converter of a pulse frequency modulation (PFM) type, power conversion is realized by a switching operation of power switches. Here, the power switches are operated corresponding to 50% duty balance. That is, the duty between the power switches is controlled to be equal.

However, a duty imbalance is generated between the power switches by a noise generated in a powering line of the converter. The duty imbalance includes a secondary rms current of the converter such that the power conversion efficiency is decreased.

The above information disclosed in this Background section is only for enhancement of understanding of the background of the invention and therefore it may contain information that does not form the prior art that is already known in this country to a person of ordinary skill in the art.

SUMMARY

Embodiments are directed toward a duty balancing oscillator for providing a duty balance between power switches.

An oscillator according to an embodiment converts an input voltage according to a switching operation of switches to determine a switching frequency of the converter generating an output voltage. The oscillator includes: a frequency setting unit determining a first half cycle of a duty signal determining the switching frequency by using a reference current according to a feedback signal corresponding to the output voltage; and a duty balancing circuit sensing a first half cycle period by using an output of the frequency setting unit, and determining the same period as the first half cycle as a second half cycle of the duty signal after the first half cycle.

The duty balancing circuit determines the second half cycle of the duty signal by decreasing the balance control voltage that is increased with a constant slope during the first half cycle with the same slope as the increasing slope after the first half cycle.

The duty balancing circuit includes a balance capacitor that is charged by the charging current during the first half cycle and is discharged to the same current as the charging current during the second half cycle, the voltage charged to the capacitor is the balance control voltage, and the duty balancing circuit compares the balance control voltage with the minimum reference voltage after the first half cycle to determine the second half cycle. The second half cycle is the period to the time that the balance control voltage is decreased to the minimum reference voltage after the first half cycle period.

The duty balancing circuit includes a charging current source charging the balance capacitor during the first half cycle, a discharging current source discharging the balance capacitor after the first half cycle, and a balance comparator comparing the balance control voltage and the minimum reference voltage.

The frequency setting unit generates a setting control voltage that is increased according to the reference current and sets as the first half cycle from the time that the setting control voltage starts to be increased to the time that the setting control voltage arrives the peak reference voltage. The frequency setting unit includes a predetermined capacitor charged by the reference current and a setting comparator comparing the voltage charged to the capacitor and the peak reference voltage, and the voltage charged to the capacitor is the setting control voltage.

The oscillator further includes an SR latch including the first input terminal input with the output of the frequency setting unit, the second input terminal input with the output of the duty balancing circuit, and the output terminal outputting the duty signal, and the SR latch changes the level of the duty signal in synchronization with the first input terminal signal, and the level of the duty signal in synchronization with the signal level of the second input terminal.

The duty balancing circuit includes: a balance capacitor charged by the charging current during the first half cycle and discharged to the same current as the charging current as the second half cycle; a charging current source charging the balance capacitor during the first half cycle; a discharging current source discharging the balance capacitor after the first half cycle; and a balance comparator comparing the balance control voltage and the minimum reference voltage and comprising the output terminal connected to the second input terminal of the SR latch, wherein the duty balancing circuit compares the balance control voltage with the minimum reference voltage after the first half cycle to determine the second half cycle.

The second half cycle is the period from the first half cycle to the time that the balance control voltage is decreased to the minimum reference voltage.

When the first half cycle is shorter than the half cycle of the threshold cycle corresponding to the limit frequency, the half cycle corresponding to the limit frequency is determined as the first half cycle. The oscillator further includes a frequency restriction unit generating the first duty control signal made with a duty balance according to the threshold cycle by using the output of the duty balancing circuit and the balance control voltage.

The frequency restriction unit includes: a restriction comparator comparing a balance control voltage and a threshold reference voltage determining the half cycle of the threshold cycle; and a first SR latch including the first input terminal input with the output of the restriction comparator, the second input terminal input with the output of the duty balancing circuit, and the output terminal outputting the duty control signal, wherein the first SR latch generates the first duty control signal determining the first half cycle according to the output of the restriction comparator, and generates the first duty control signal determining the second half cycle according to the output of the duty balancing circuit.

The oscillator further includes a second SR latch including the first input terminal input with the output of the setting comparator, the second input terminal input with the output of the duty balancing circuit, and the output terminal outputting the second duty control signal. The second SR latch changes the level of the second duty control signal in synchronization with the level of the first input terminal signal, and the level of the second duty signal in synchronization with the level of the second input terminal signal.

The oscillator further includes a logic calculator outputting the signal having the shorter duty among the first duty control signal and the second duty control signal as the duty signal.

The duty balancing circuit generates the output determining the period from the first half cycle to the time that the cycle count signal arrives the reference count value as the second half cycle if the cycle count signal is increased according to a digital clock signal from the reference count value during the first half cycle and is decreased the cycle count signal counted during the first half cycle after the first half cycle according to the digital clock signal such that the cycle count signal arrives at the reference count value.

The duty balancing circuit further includes a counter determining one of an increasing count mode and a decreasing count mode according to the duty signal and increasing or decreasing the cycle count signal according to the digital clock signal according to the determined mode, and a logic calculator receiving the cycle count signal and determining whether the cycle count signal arrives the reference count value to generate the output of the duty balancing circuit.

The oscillator further includes an SR latch including the first input terminal input with the output of the frequency setting unit, the second input terminal input with the output of the duty balancing circuit, and the output terminal outputting the duty signal. The SR latch changes the level of the duty signal in synchronization with the level of the first input terminal signal, and the level of the duty signal in synchronization with the level of the second input terminal signal.

The oscillator further includes a frequency restriction unit generating the first duty control signal made with a duty balance according to the threshold cycle by using the output of the duty balancing circuit and the balance control voltage.

The frequency restriction unit includes: a minimum count comparison unit generating the cycle count signal and the output according to the comparing result of the minimum count corresponding to the half cycle of the threshold cycle; and a first SR latch including a first input terminal input with the output of the minimum count comparison unit, the second input terminal input with the output of the duty balancing circuit, and the output terminal outputting the first duty control signal, and the first SR latch generates the first duty control signal determining the first half cycle according to the output of the minimum count comparison unit, and the first duty control signal determining the second half cycle according to the duty balancing circuit.

The oscillator further includes a second SR latch including the first input terminal input with the output of the frequency setting unit, the second input terminal input with the output of the duty balancing circuit, and the output terminal outputting the second duty control signal, and the second SR latch changes the level of the second duty control signal in synchronization with the level of the first input terminal signal, and the level of the second duty control signal in synchronization with the level of the second input terminal signal.

The oscillator further includes a logic calculator outputting the signal having the shorter duty among the first duty control signal and the second duty control signal as the duty signal.

An embodiment provides a duty balancing oscillator capable of providing the duty balance between the power switches.

DETAILED DESCRIPTION OF THE EMBODIMENTS

Figure 1:
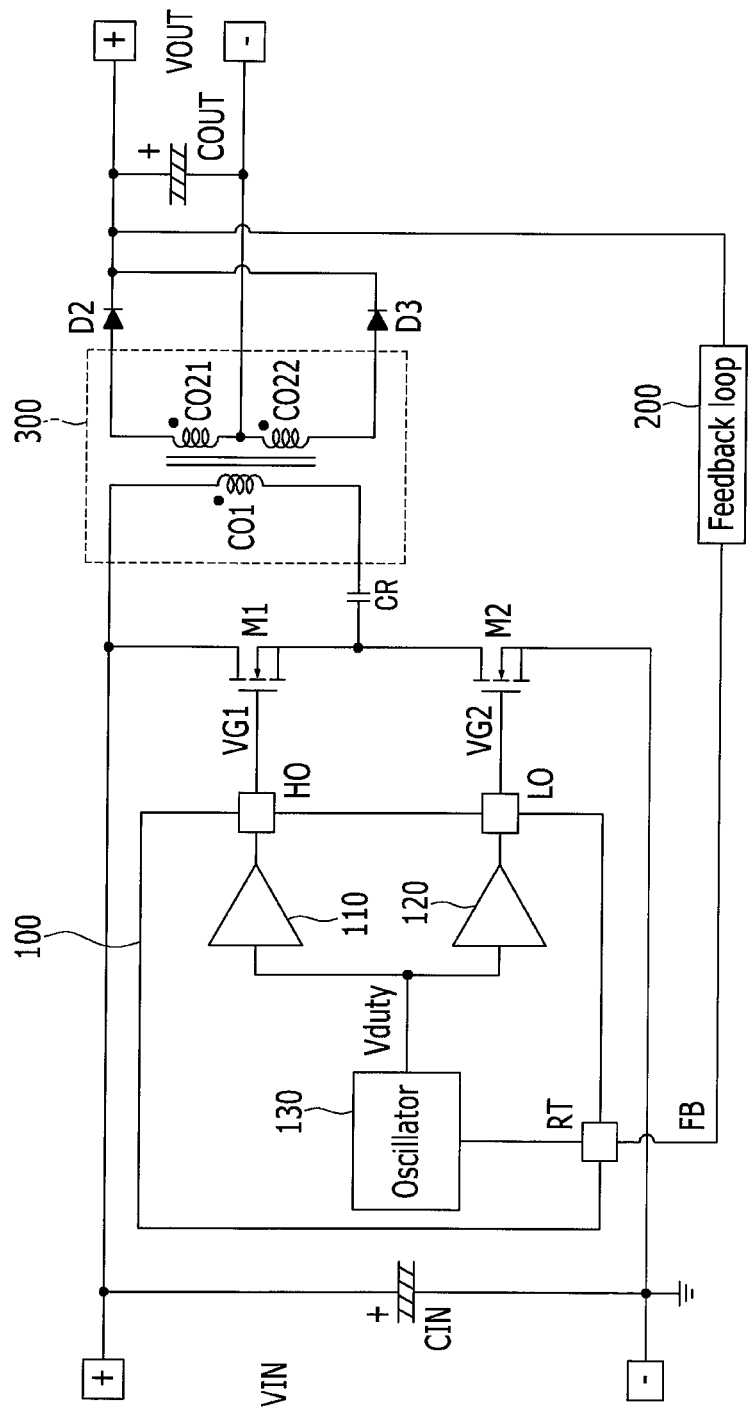
FIG. 1 is a view of a resonant converter including an oscillator according to an exemplary embodiment.

In the following detailed description, only certain exemplary embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a view of a resonant converter including an oscillator according to an exemplary embodiment.

A resonant converter includes a high side switch M1, a low side switch M2, a pulse frequency modulator (PFM) 100, a feedback loop 200, and a transformer 300.

A rectifying output diode D1 rectifies the current of the secondary coil Co21 of the transformer 300 and controls the current flow to the output terminal (+). The output diode D2 rectifies the current flowing to the secondary coil Co22 of the transformer 300 and controls the current flow to the output terminal (+). The capacitor COUT smoothes the output voltage VOUT. The capacitor CIN smoothes the input voltage VIN.

The high side switch M1 and the low side switch M2 are alternately turned-on/off while forming the duty balance. The high side switch M1 is controlled by the gate signal VG1 transmitted from the pulse frequency modulator 100, and the low side switch M2 is controlled by the gate signal VG2. The high side switch M1 and the low side switch M2 according to an exemplary embodiment are realized by a MOSFET (metal oxide semiconductor field-effect transistor) of an N-channel type. The switching operation frequency of the high side switch M1 and the low side switch M2 is referred to as a switching frequency.

The input voltage VIN is changed into a square wave by the switching operation of the high side switch M1 and the low side switch M2 such that resonance is generated between the transformer 300 and the capacitor CR. The resonance is generated between the leakage inductance, the magnetizing inductance, and the resonance capacitor CR of the transformer 300 including the primary coil CO1 and the secondary coils CO21 and CO22.

The current is generated in the secondary coils CO21 and CO22 according to the resonance current generated in the primary coil CO1 by the resonance. The current generated in the secondary coil CO21 flows to the output terminal (+) through the rectifying diode D1, and the current generated in the secondary coil CO22 flows to the output terminal (+) through the rectifying diode D2.

The pulse frequency modulator 100 includes a first gate driver 110, a second gate driver 120, and an oscillator 130. The oscillator 130 includes a duty balancing circuit according to an exemplary embodiment.

The first gate driver 110 generates the first gate signal VG1 for the switching operation of the high side switch M1 according to the duty signal Vduty from the oscillator 130. The second gate driver 120 generates the second gate signal VG2 for the switching operation of the low side switch M2 according to the duty signal Vduty.

The first gate driver 110 generates the first gate signal VG1 turning on the high side switch M1 in synchronization with the increasing edge of the duty signal Vduty, and the first gate signal VG1 turning off the high side switch M1 in synchronization with the decreasing edge of the duty signal Vduty.

The second gate driver 120 generates the second gate signal VG2 turning on the low side switch M2 in synchronization with the decreasing edge of the duty signal Vduty, and the second gate signal VG2 turning off the low side switch M2 in synchronization with the increasing edge of the duty signal Vduty.

The gate driver of the present invention is not limited thereto, and generates the first gate signal VG1 and the second gate signal VG2 to alternately turn the high side switch M1 and the low side switch M2 on/off according to the duty signal Vduty.

The feedback loop 200 generates a feedback signal IFB and transmits it to the pulse frequency modulator 100 according to the output voltage VOUT.

The feedback signal IFB according to an exemplary embodiment is decreased if the load is increased such that the output voltage VOUT is decreased, and is increased if the load is decreased such that the output voltage VOUT is increased.

The oscillator 130 generates the duty signal Vduty determining the switching frequency according to the feedback current IFB.

The pulse frequency modulator 100 includes an RT pin input with the feedback current IFB from the feedback loop 200, an HO pin outputting the first gate signal VG1, and an LO pin outputting the second gate signal VG2.

Figure 2:
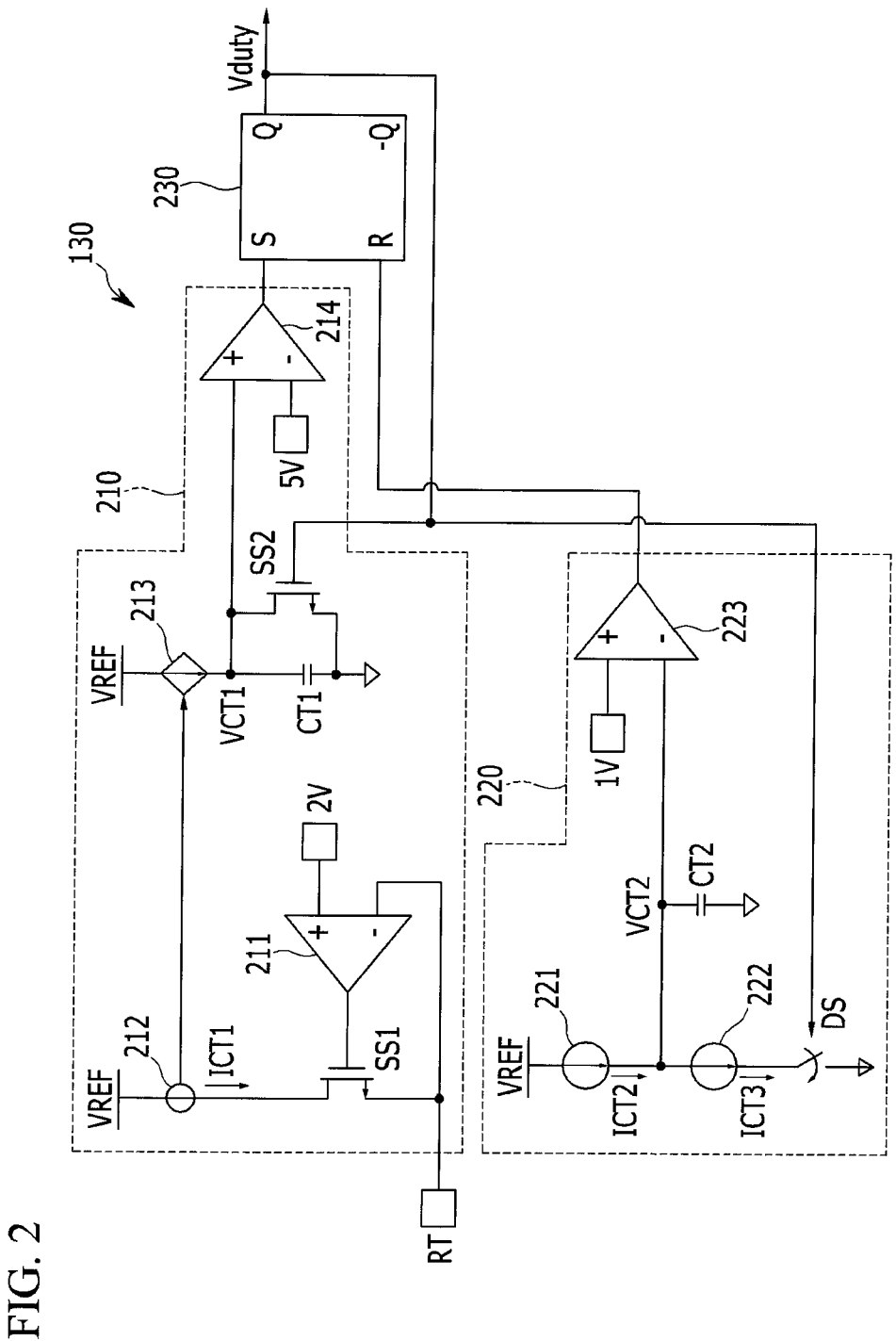
FIG. 2 is a view of an oscillator of a duty balancing circuit according to the first exemplary embodiment.

FIG. 2 is a view showing an oscillator including a duty balancing circuit according to the first exemplary embodiment.

The oscillator 130 includes a frequency determining unit 210, a duty balancing circuit 220, and an SR latch 230.

The frequency determining unit 210 determines the half cycle of the switching cycle according to the switching frequency according to the feedback current IFB transmitted through the RT pin.

The duty balancing circuit 220 determines the same half cycle as the switching half cycle determined by the frequency determining unit 210.

Hereafter, the half cycle determined in the frequency determining unit 210 is referred to as the first half cycle, and the half cycle determined in the duty balancing circuit 220 is referred to as the second half cycle.

The SR latch 230 generates and outputs the duty signal Vduty according to the first half cycle and the second half cycle.

Next, each configuration will be described with reference to FIG. 2.

The frequency determining unit 210 senses the feedback current IFB to generate the reference current ICT1 and charges the setting capacitor CT1 with the reference current ICT1. The period in which the setting control voltage VCT1 charged to the setting capacitor CT1 starts to be increased and arrives at a predetermined peak reference voltage (5V in the first exemplary embodiment) is determined as the first half cycle.

The frequency determining unit 210 includes an error amplifier 211, a current mirror 212, a dependent current source 213, a setting capacitor CT1, two switches SS1 and SS2, and a setting comparator 214.

The two switches SS1 and SS2 are N-channel transistors. This is only one exemplary embodiment, and the present invention is not limited thereto.

The error amplifier 211 includes a non-inversion terminal (+) input with a reference voltage of 2V and the inversion terminal (−) connected to the RT pin. The output terminal of the error amplifier 211 is connected to the gate electrode of the switch SS1. The source electrode of the switch SS1 is connected to the RT pin.

The error amplifier 211 amplifies and outputs the error of the voltage of the RT pin and the reference voltage of 2V. Accordingly, the conduction degree of the switch SS1 is adjusted according to the error between the voltage of the RT pin and the reference voltage of 2V.

If the feedback current IFB is increased according to the decreasing of the load, the voltage of the RT pin is decreased. As the voltage of the RT pin is decreased such that it is less than the reference voltage of 2V, the output voltage of the error amplifier 211 is increased. Thus, the reference current ICT1 output through the switch SS1 is increased. If the reference current ICT1 is increased, the first half cycle is decreased and the switching frequency is increased. As described above, if the voltage of the RT pin is decreased according to the decreasing of the load, the switching frequency is increased such that the power supplied to the output terminal is decreased.

In contrast, if the feedback current IFB is decreased according to the decreasing of the load, the voltage of the RT pin is increased. As the voltage of the RT pin is increased such that it is close to the reference voltage of 2V, the output voltage of the error amplifier 211 is decreased. Thus, the reference current ICT1 output through the switch SS1 is decreased. If the reference current ICT1 is decreased, the first half cycle is elongated and the switching frequency is decreased. As described above, if the voltage of the RT pin is increased according to the increasing of the load, the switching frequency is decreased such that the power supplied to the output terminal is increased.

The current mirror 212 copies the reference current ICT1 and transmits it to the dependant current source 213. In the first exemplary embodiment, the current mirror 212 copies the reference current ICT1 at a ratio of 1:1 and transmits it to the dependant current source 213. This is a detailed description for better understanding, and the present invention is not limited thereto.

The dependant current source 213 transmits the reference current ICT1 transmitted from the current mirror 212 to the setting capacitor CT1. During the period in which the switch SS2 is turned off, the setting capacitor CT1 is charged by the reference current ICT1. If the switch SS2 is turned on, the setting capacitor CT1 is quickly discharged. The setting control voltage VCT1 is the voltage charged to the setting capacitor CT1 such that it is increased during the period in which the switch SS2 is in the off state, and if the switch SS2 is turned on, it becomes 0V.

The setting comparator 214 includes the non-inversion terminal (+) input with the setting control voltage VCT1 and the inversion terminal (−) input with the reference voltage of 5V. The setting comparator 214 generates the high level when the input of the non-inversion terminal (+) is more than the input of the inversion terminal (−), and the low level if not.

The SR latch 230 outputs the high level though the output terminal Q when the input of the set terminal S is the high level, and it outputs the low level through the output terminal Q when the input of the reset terminal (R) is the high level.

If the setting control voltage VCT1 arrives at the reference voltage 5V, the setting comparator 214 outputs the signal of the high level. If the setting control voltage VCT1 arrives at 5V, the duty signal Vduty becomes the high level such that the switch SS2 is turned on. Accordingly, after the setting control voltage VCT1 arrives at 5V, it is quickly decreased.

The frequency setting unit 210 determines the period that the setting control voltage VCT1 is increased as the first half cycle, and generates the output such that the duty signal Vduty is increased in synchronization after the first half cycle from the time that the setting control voltage VCT1 is increased. The present invention is not limited thereto, and the output of the frequency setting unit 210 may be generated such that the duty signal Vduty may be decreased in synchronization after the first half cycle from the time that the setting control voltage VCT1 starts to be increased. The edge of the duty signal Vduty is generated by the output generated from the frequency setting unit 210.

The duty balancing circuit 220 senses the first half cycle by using the output of the frequency setting unit 210 and determines the same second half cycle as the detected first half cycle.

The duty balancing circuit 220 includes the balance control voltage VCT2 during the first half cycle. The duty balancing circuit 220 decreases the balance control voltage VCT2 after the first half cycle to determine the period to the time that it arrives at the minimum reference voltage (1V in the first exemplary embodiment) as the second half cycle. Here, the absolute value of the slope that the balance control voltage VCT2 is increased during the first half cycle and the slope that it is decreased during the second half cycle are the same. Accordingly, the first half cycle and the second half cycle are controlled with the same period.

The duty balancing circuit 220 includes a charging current source 221, a discharging current source 222, a discharging switch DS, a balance capacitor CT2, and a balance comparator 223. It is explained that the discharging switch DS is turned on by the signal of the high level and is turned off by the signal of the low level. The discharging current ICT3 of the discharging current source 222 is twice the charging current ICT2 of the charging current source 221.

The charging current source 221 is connected to one terminal of the balance capacitor CT2, and is the current source charging the balance capacitor CT2. The discharging current source 222 is connected to one terminal of the balance capacitor CT2 and is the current source discharging the balance capacitor CT2.

One terminal of the balance capacitor CT2 is connected to the inversion terminal (−) of the balance comparator 223. The non-inversion terminal (+) of the balance comparator 223 is input with the reference voltage of 1V. The output of the balance comparator 223 is connected to the reset terminal (R) of the SR latch 230.

During the period that the discharging switch DS is in the off state, the balance capacitor CT2 is charged by the charging current ICT2. The balance control voltage VCT2 is increased with a slope determined by the charging current ICT2.

During the period that the discharging switch DS is in the on state, the balance capacitor CT2 is discharged with a current of the charging current ICT2 subtracted from the discharging current ICT3, that is, with the same current of the charging current ICT2. Accordingly, the absolute values of the increase slope and the decrease slope of the balance control voltage VCT2 are the same.

Next, a method of determining the same second half cycle as the first half cycle according to the operation of the duty balancing circuit 220 will be described with reference to FIG. 3.

Figure 3:
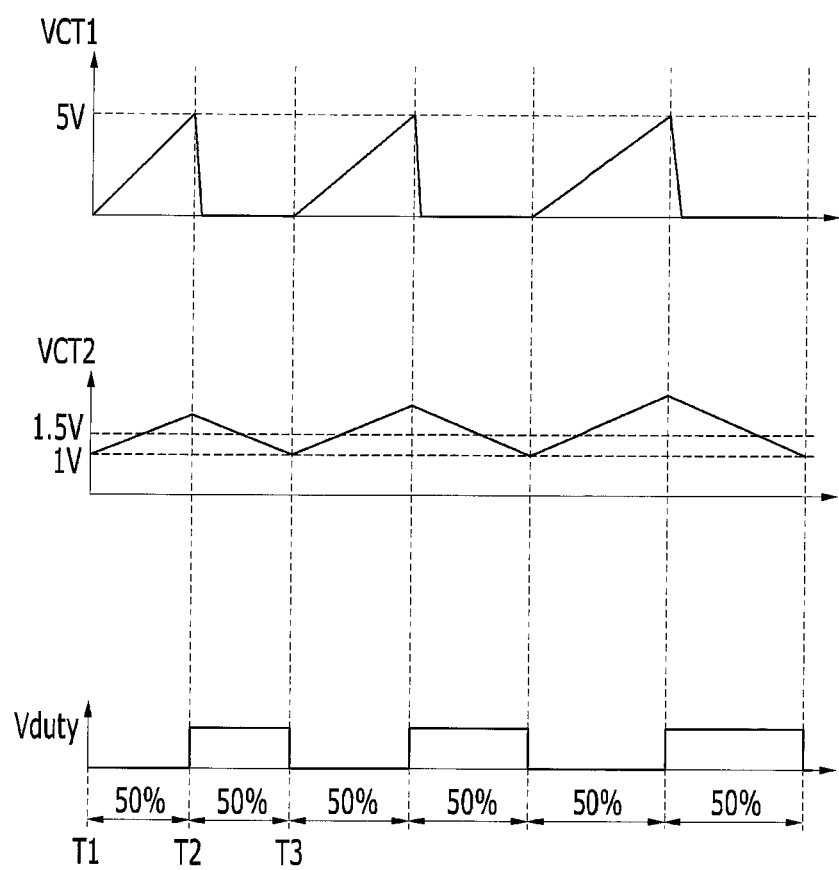
FIG. 3 is a waveform diagram showing two control voltages and a duty signal according to the first exemplary embodiment.

FIG. 3 is a waveform diagram of two control voltages and a duty signal according to the first exemplary embodiment.

The setting control voltage VCT1 starts to be increased by the reference current ICT1 from the time T1. Here, the duty signal Vduty is the low level such that the discharging switch DS is in the turned-off state and the balance control voltage VCT2 is increased by the charging current ICT2.

If the setting control voltage VCT1 arrives at the reference voltage of 5V at the time T2, the duty signal Vduty becomes the high level by the output of the setting comparator 214. Thus, the switch SS2 is turned on such that the setting control voltage VCT1 is quickly decreased. The discharging switch DS is turned on by the duty signal Vduty of the high level, and the balance control voltage VCT2 is decreased with the same slope as the increasing period.

If the balance control voltage VCT2 is decreased to the reference voltage 1V at the time T3, the output of the balance comparator 223 becomes the high level, and the duty signal Vduty is the low level.

Thus, the switch SS2 is turned off, the setting control voltage VCT1 again starts to be increased from the time T3, and the discharging switch DS is turned off such that the balance control voltage VCT2 again starts to be increased from the time T3. By this method, the first half cycle is determined as the period that the setting control voltage VCT1 arrives at the reference voltage of 5V. The control voltage VCT2 that is increased from the reference voltage of 1V during the first half cycle is decreased with the same slope from the end time of the first half cycle such that the period to the time of arriving at the reference voltage of 1V is determined as the second half cycle. Accordingly, the first half cycle and the second half cycle are the same period. Thus, the duty of the duty signal Vduty is correctly controlled at 50%, thereby realizing the duty balance.

In FIG. 3, the reference current ICT1 is decreased and the increasing slope of the setting control voltage VCT1 is decreased. The reference current ICT1 is changed according to the feedback current IFB, as the setting to realize the duty balance, but the present invention is not limited thereto.

That is, although the increasing/decreasing of the reference current ICT1 is repeated, if the first half cycle is set, the second half cycle is set the same as the first half cycle such that the duty balance is realized.

The switching frequency may be excessively increased at a soft start period or a no-load state. If the switching frequency is excessively high, the turn-on time is very short such that the switch may not be turned on and the switching loss may be increased, and accordingly it is necessary to restrict the switching frequency with an appropriate limit frequency.

An oscillator according to the second exemplary embodiment further includes a frequency restriction unit maintaining the switching frequency as a limit frequency when the switching frequency tends to be over the limit frequency.

Figure 4:
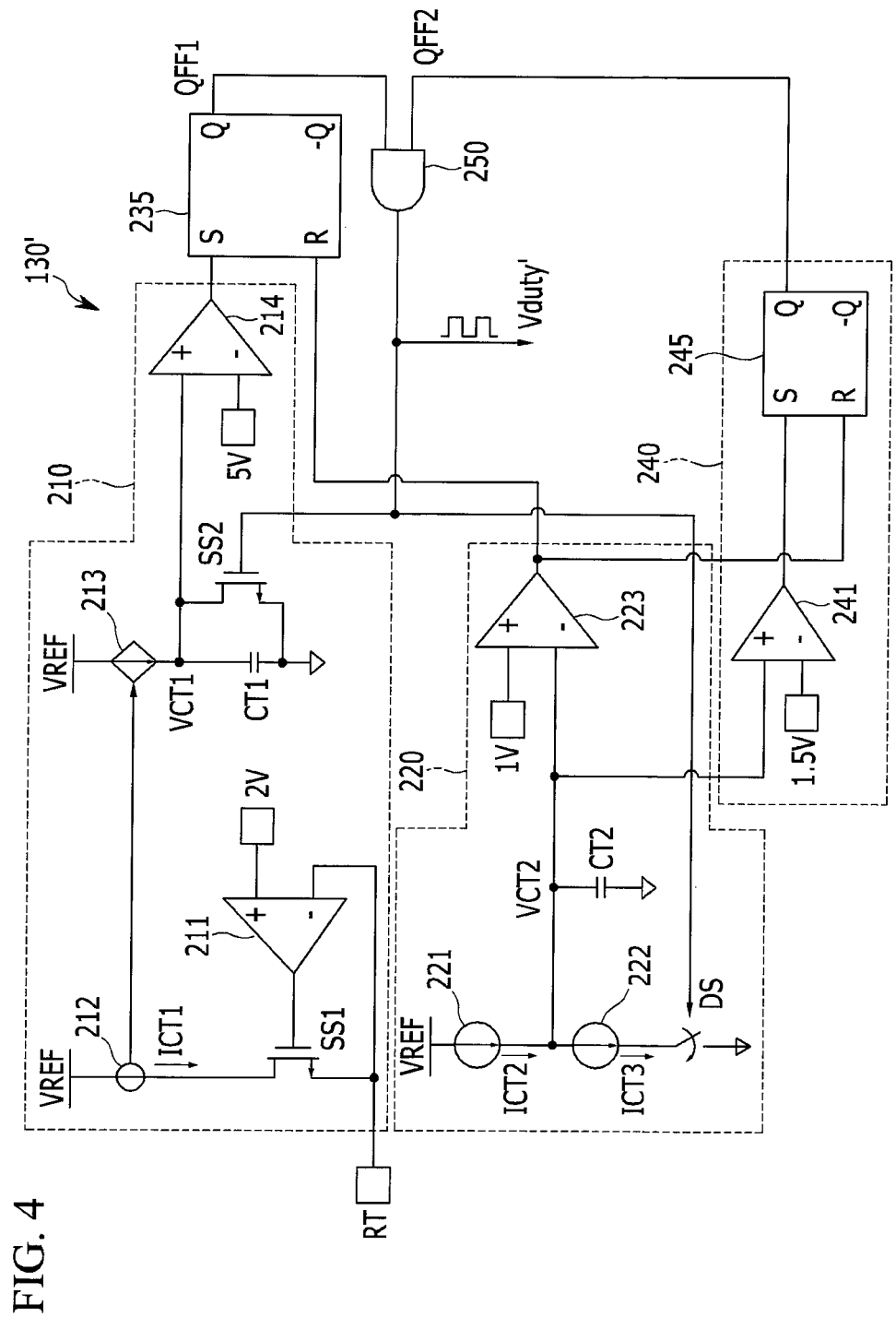
FIG. 4 is a view of an oscillator according to the second exemplary embodiment.

FIG. 4 is a view showing an oscillator according to the second exemplary embodiment.

Compared with the first exemplary embodiment, an oscillator 130' according to the second exemplary embodiment further includes a frequency restriction unit 240 to maintain the switching frequency as the limit frequency.

When the first half cycle is a half cycle of a predetermined threshold cycle corresponding to the limit frequency, the frequency restriction unit 240 determines the half cycle corresponding to the limit frequency as the first half cycle by using the output of the duty balancing circuit 220 and the balance control voltage VCT2.

In detail, the frequency restriction unit 240 generates and outputs the duty control signal QFF2 following the threshold cycle and made of the duty balance by using the balance control voltage VCT2 and the output of the duty balancing circuit 220.

The oscillator 130' according to the second exemplary embodiment further includes an AND gate 250 to generate the duty signal according to the output of the frequency restriction unit 240 and the output of the SR latch 235.

The same frequency setting unit and duty balancing circuit as that of the first exemplary embodiment are indicated by the same reference numerals, and the description thereof is omitted.

As shown in FIG. 4, the frequency restriction unit 240 includes a comparator 241 and an SR latch 245.

The comparator 241 generates the output signal for the result of comparing the balance control voltage VCT2 with the reference voltage of 1.5V. The comparator 241 includes the non-inversion terminal (+) input with the balance control voltage VCT2 and the inversion terminal (−) input with the reference voltage of 1.5V, and if the input of the non-inversion terminal (+) is more than the input of the inversion terminal (−), it outputs the signal of the high level, or if not, it outputs the signal of the low level. If the balance control voltage VCT2 arrives at the reference voltage of 1.5V, the comparator 241 outputs the signal of the high level, and if the balance control voltage VCT2 is less than the reference voltage 1.5V, the comparator 241 outputs the signal of the low level.

When the input of the set terminal S is the high level, the SR latch 235 and the SR latch 245 output the high level through the output terminal Q, when the input of the reset terminal R is the high level, they output the low level through the output terminal Q.

The SR latch 245 generates the duty control signal QFF2 according to the output of the comparator 241 and the output of the duty balancing circuit 220. The SR latch 245 generates the duty control signal QFF2 of the high level at the time that the output of the comparator 241 becomes the high level, and outputs the duty control signal QFF2 of the low level at the time that the output of the duty balancing circuit 220 becomes the high level.

The SR latch 235 generates the duty control signal QFF1 according to the output of the frequency setting unit 210 and the output of the duty balancing circuit 220.

The AND gate 250 generates the duty signal Vduty' through the calculation of the AND logic of two duty control signals QFF1 and QFF2.

When the switching frequency is less than the limit frequency, the balance control voltage VCT2 in the first half cycle period becomes the voltage larger than the reference voltage of 1.5V, the duty of the duty control signal QFF2 is wider than the duty of the duty control signal QFF1. Accordingly, the duty signal Vduty' is the same as the duty control signal QFF1.

However, when the switching frequency is more than the limit frequency, the balance control voltage VCT2 in the first half cycle period does not arrive at the reference voltage 1.5V such that the duty of the duty control signal QFF1 is wider than the duty of the duty control signal QFF2. Accordingly the duty signal Vduty' is the same as the duty control signal QFF2.

Next, the operation and the duty signal Vduty' of the oscillator 130' including the frequency restriction unit 240 will be described with reference to FIG. 5 and FIG. 6.

Figure 5:
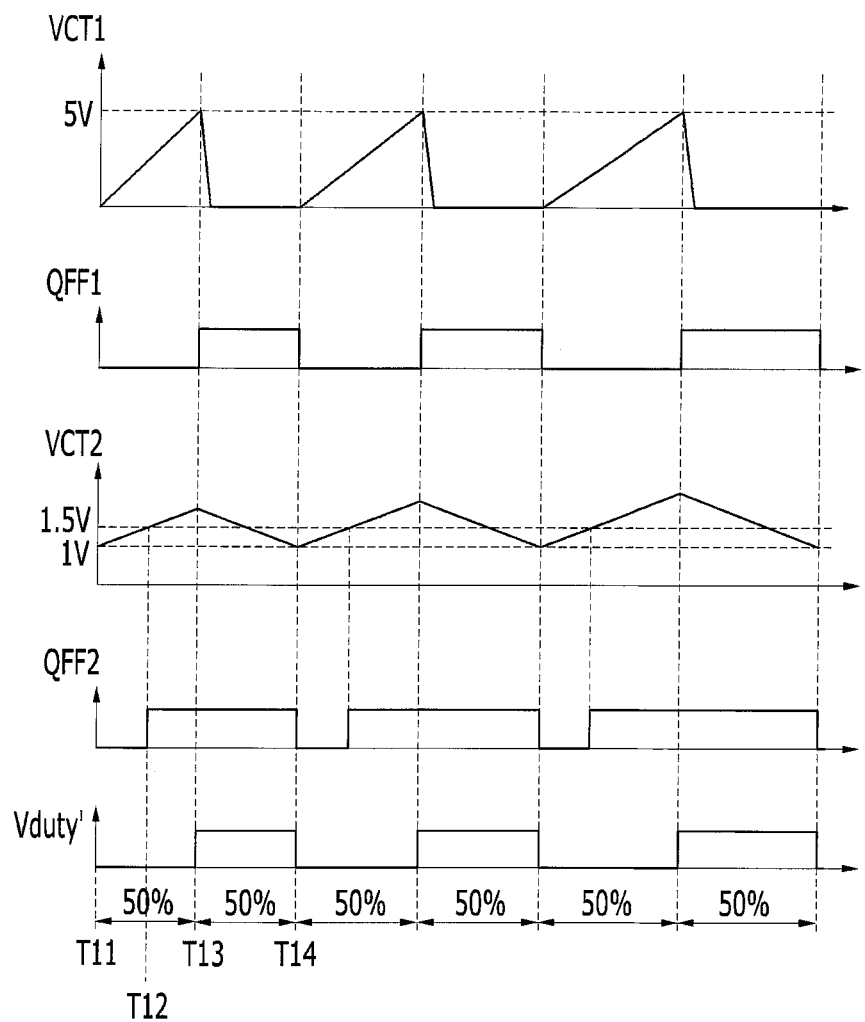
FIG. 5 is a view showing a duty signal generated from an oscillator according to the second exemplary embodiment, when a switching frequency is lower than a limit frequency.

FIG. 5 is a view showing a duty signal generated from the oscillator according to the second exemplary embodiment, when the switching frequency is lower than the limit frequency.

Figure 6:
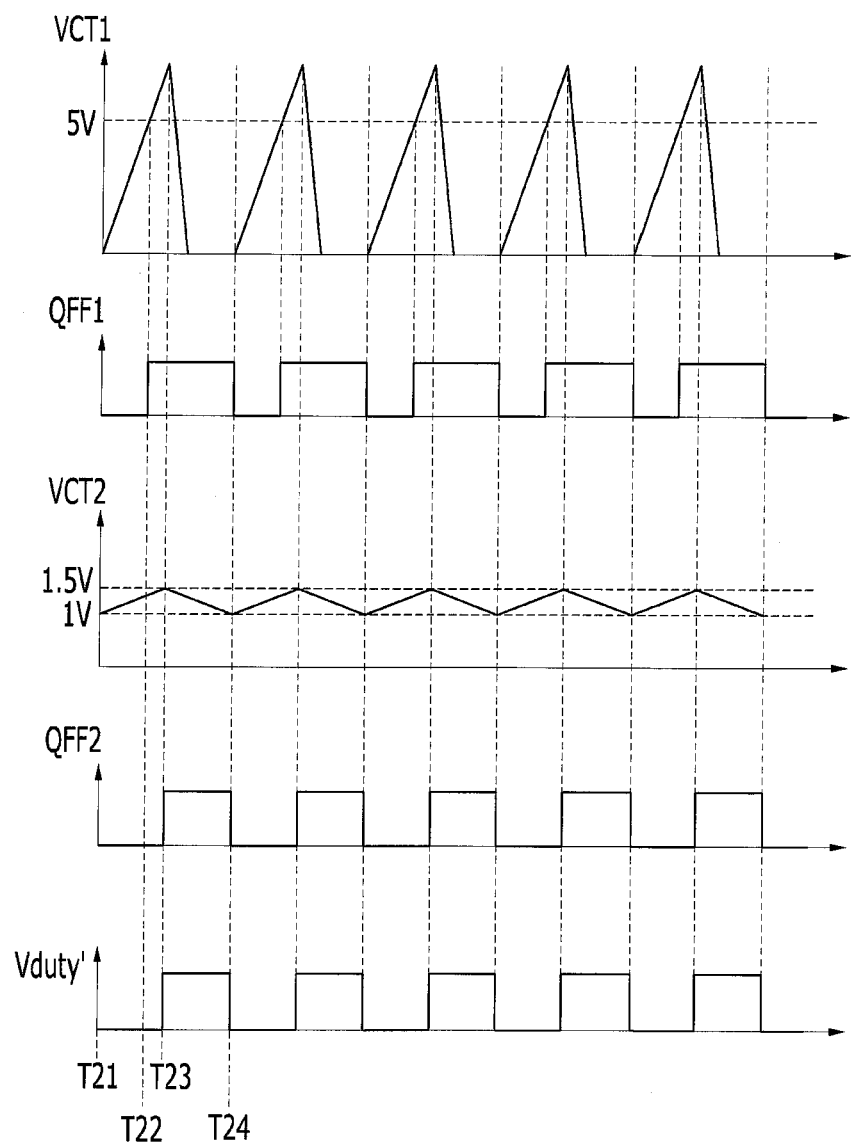
FIG. 6 is a view showing a duty signal generated from an oscillator according to the second exemplary embodiment, when a switching frequency is higher than a limit frequency.

FIG. 6 is a view showing a duty signal generated from the oscillator according to the second exemplary embodiment, when the switching frequency is higher than the limit frequency.

As shown in FIG. 5, the setting control voltage VCT1 starts to be increased by the reference current ICT1 at the time T11, and the balance control voltage VCT2 starts to be increased by the charging current ICT2.

If the balance control voltage VCT2 arrives at the reference voltage of 1.5V at the time T12, the output of the comparator 241 is increased to the high level, and the SR latch 245 generates the duty control signal QFF2 of the high level.

If the setting control voltage VCT1 arrives at the reference voltage of 5V at the time T13, the SR latch 235 generates the duty control signal QFF1 of the high level. Thus, the duty signal Vduty' becomes the high level from the time T13, and the period T11-T13 is set as the first half cycle.

The duty signal Vduty' becomes the high level from the time T13 such that the setting control voltage VCT1 is quickly decreased by the turn-on of the switch SS2, and the balance control voltage VCT2 is decreased by the discharging current ICT3 with the same slope as the increasing period.

If the balance control voltage VCT2 arrives at the reference voltage of 1V at the time T14, the output of the duty balancing circuit 220 becomes the high level such that the SR latch 245 generates the duty control signal QFF2 of the low level. The SR latch 235 generates the duty control signal QFF1 of the low level according to the output of the duty balancing circuit 220 of the high level.

The duty signal Vduty' becomes the low level by the duty control signal QFF1 and the duty control signal QFF2 at the time T14.

As described above, when the switching frequency is less than the limit frequency, the duty of the duty control signal QFF1 is less than the duty of the duty control signal QFF2 such that the duty signal Vduty' is equal to the duty control signal QFF1.

Referring to FIG. 6, the duty signal Vduty' in the case that the switching frequency is more than the limit frequency will be described.

As shown in FIG. 6, the setting control voltage VCT1 starts to be increased by the reference current ICT1 at the time T21, and the balance control voltage VCT2 starts to be increased by the charging current ICT2.

If setting control voltage VCT1 arrives at the reference voltage of 5V at the time T22, the SR latch 235 generates the duty control signal QFF1 of the high level.

If the balance control voltage VCT2 arrives at the reference voltage of 1.5V at the time T23, the output of the comparator 241 is increased to the high level, and the SR latch 245 generates the duty control signal QFF2 of the high level.

Thus, the duty signal Vduty' becomes the high level from the time T23, and the period T21-T23 is set as the first half cycle.

The duty signal Vduty' becomes the high level from the time T23 such that the setting control voltage VCT1 is quickly decreased by the turn-on of the switch SS2, and the balance control voltage VCT2 is decreased with the same slope as the increasing period by the discharging current ICT3.

If the balance control voltage VCT2 arrives at the reference voltage of 1V at the time T24, the output of the duty balancing circuit 220 becomes the high level such that the SR latch 245 generates the duty control signal QFF2 of the low level. The SR latch 235 generates the duty control signal QFF1 of the low level according to the output of the duty balancing circuit 220 of the high level.

The duty signal Vduty' becomes the low level by the duty control signal QFF1 and the duty control signal QFF2 at the time T24.

As described above, in the case that the switching frequency is more than the limit frequency, the duty of the duty control signal QFF2 is less than the duty of the duty control signal QFF1 such that the duty signal Vduty' is equal to the duty control signal QFF2.

Also, the balance control voltage VCT2 is decreased with the same slope as the increasing slope during the first half cycle such that the second half cycle is determined, thereby realizing the duty balance.

Next, the oscillator 130" according to the third exemplary embodiment will be described.

Figure 7:
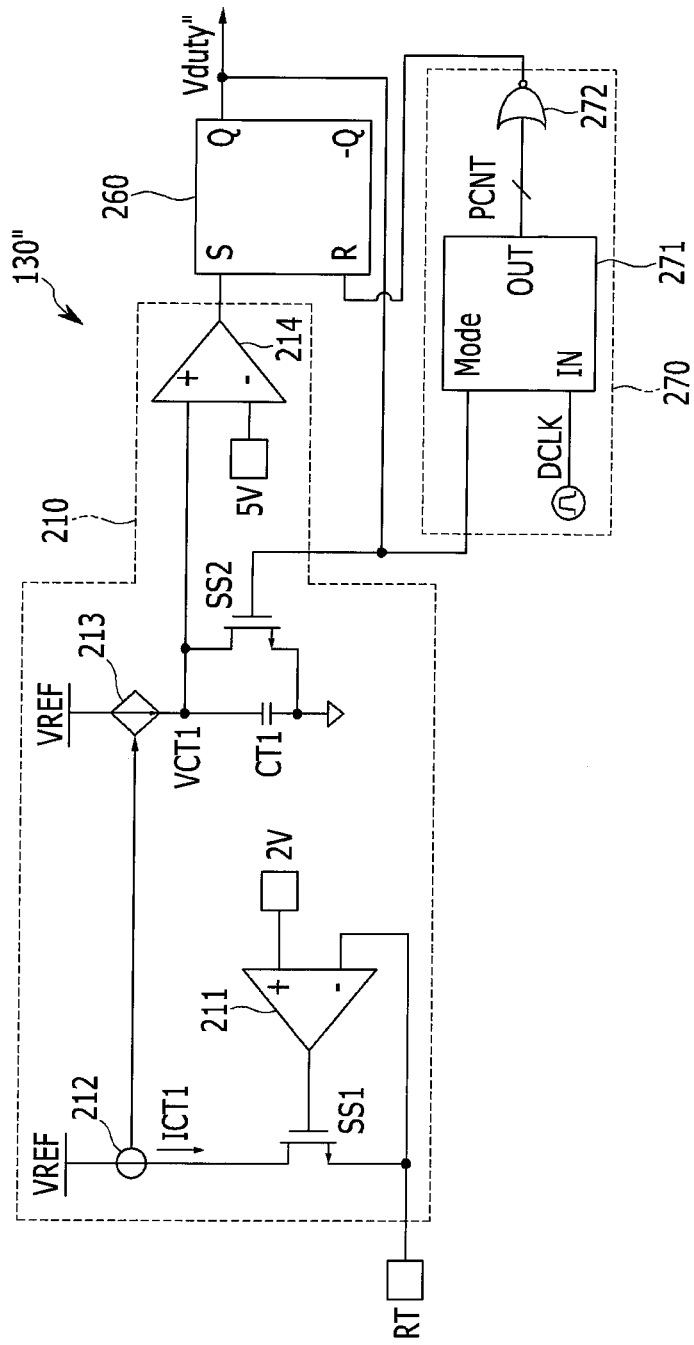
FIG. 7 is a view showing an oscillator according to the third exemplary embodiment.

FIG. 7 is a view showing an oscillator according to the third exemplary embodiment.

An oscillator 130" according to the third exemplary embodiment counts the first half cycle according to the digital clock signal DCLK and determines the second half cycle according to the count result during the first half cycle.

In detail, the oscillator 130" generates the cycle count signal PCNT that is increased according to the digital clock signal DCLK during the first half cycle from the reference count value, and is decreased according to the digital clock signal DCLK to the reference count value after the first half cycle.

The digital clock signal DCLK is a signal having a constant frequency such that if the cycle count signal PCNT that is increased during the first half cycle from the reference count value is decreased to the reference counter value according to the digital clock signal DCLK after the first half cycle, the period in which the cycle count signal PCNT is decreased is the same as the first half cycle. Here, if the period in which the cycle count signal PCNT is decreased is set as the second half cycle, the first half cycle and the second half cycle are set as the same period.

Referring to FIG. 7, the oscillator 130" will be described. Hereafter, the reference count value is set as 0.

The oscillator 130" includes a frequency setting unit 210, a duty balancing circuit 270, and an SR latch 260.

The frequency setting unit 210 according to the third exemplary embodiment has the same configuration and function as that of the frequency setting unit 210 of the first and second exemplary embodiments such that they are indicated by the same reference numeral, and the description thereof is omitted.

The SR latch 260 includes a set terminal S input with the output of the frequency setting unit 210 and a reset terminal R input with the output of the duty balancing circuit 270. The SR latch 260 generates the duty signal Vduty" of the high level if the set terminal S is input with the signal of the high level, and if the reset terminal R is input with the signal of the high level, the duty signal Vduty" of the low level is generated.

The duty balancing circuit 270 senses the first half cycle by using the output of the frequency setting unit 210 and determines the same second half cycle as the sensed first half cycle.

The duty balancing circuit 270 increases the cycle count signal PCNT according to the digital clock signal DCLK from the reference count value during the first half cycle. After the first half cycle, the duty balancing circuit 270 decreases the cycle count signal PCNT that is counted during the first half cycle according to the digital clock signal DCLK such that if the cycle count signal PCNT arrives the reference count value, the period to the time that the cycle count signal PCNT arrives at the reference count value after the first half cycle is determined as the second half cycle.

The duty balancing circuit 270 includes a counter 271 and a NOR gate 272.

The counter 271 is determined as one of an increasing count mode and a decreasing count mode according to the duty signal Vduty" such that the cycle count signal PCNT is increased or decreased according to the digital clock signal DCLK. The counter 271 includes a mode terminal Mode input with the duty signal Vduty", an input terminal input with the digital clock signal DCLK, and an output terminal OUT outputting the cycle count signal PCNT.

The counter 271 is operated with an increasing count mode during period in which the duty signal Vduty" is the low level. That is, the counter 271 increases the cycle count signal PCNT according to the digital clock signal DCLK. The counter 271 may represent the cycle count signal PCNT as an N-bit signal.

The counter 271 is operated with the decreasing count mode during the period in which the duty signal Vduty" is the high level. That is, the counter 271 decreases the cycle count signal PCNT according to the digital clock signal DCLK.

The duty balancing circuit 270 includes the NOR gate 272 to determine whether the cycle count signal PCNT arrives at the reference count value.

The present invention is not limited thereto. If the reference count value is not 0 but is a different value, the duty balancing circuit 270 may determine whether the cycle count signal PCNT arrives at the reference count value by using another circuit instead of the NOR gate.

The NOR gate 272 outputs the high level when all inputs are the low level. If the cycle count signal PCNT arrives at 0 as the reference count value, all bits of the N-bit signal are 0 such that the NOR gate 272 outputs the high level.

The SR latch 260 outputs the duty signal Vduty" of the low level by the high level output of the NOR gate 272.

As described above, by using the same digital clock signal, the cycle count signal PCNT that is increasing-decreased during the first half cycle is decreasing-counted to set the second half cycle such that the first half cycle and the second half cycle are equal to each other. Accordingly, the duty balance is realized.

Next, the operation and the duty signal Vduty" of the oscillator 130" according to the third exemplary embodiment will be described with reference to FIG. 8.

Figure 8:
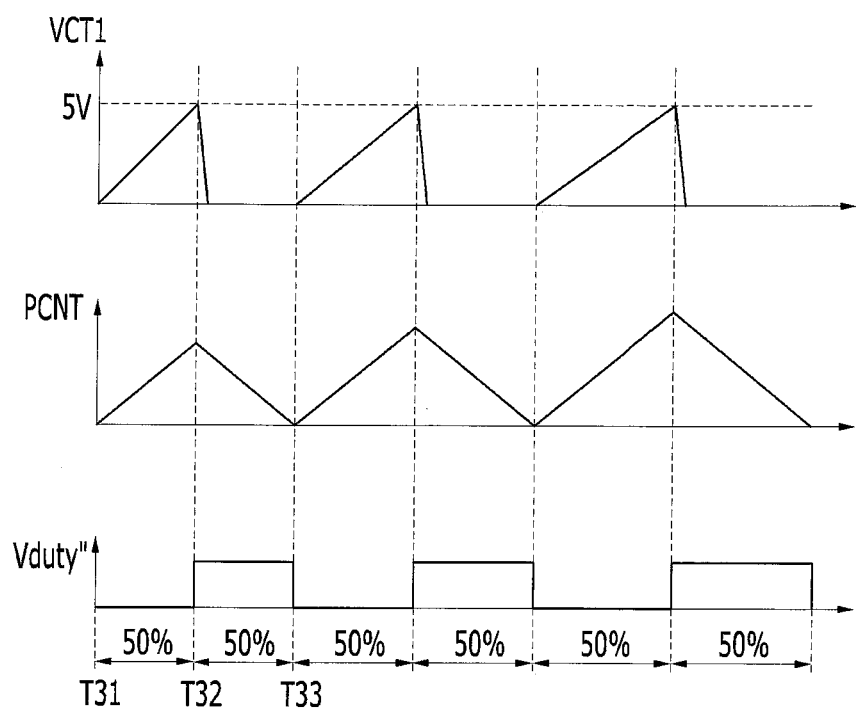
FIG. 8 is a waveform diagram showing a control voltage, a cycle count signal, and a duty signal according to the third exemplary embodiment.

FIG. 8 is a waveform diagram showing a control voltage, a cycle count signal, and a duty signal according to the third exemplary embodiment.

As shown in FIG. 8, the setting control voltage VCT1 starts to be increased by the reference current ICT1 at the time T31. Here, the duty signal Vduty" is the low level such that the counter 271 starts the increasing count according to the digital clock signal DCLK to start the increasing of the cycle count signal PCNT.

If the setting control voltage VCT1 arrives at the reference voltage of 5V at the time T32, the set terminal S of the SR latch 260 is input with the high level such that the duty signal Vduty" of the high level is output. The switch SS2 is turned on by the high level of the duty signal Vduty" such that the setting control voltage VCT1 is quickly decreased.

The duty signal Vduty" is the high level such that the counter 271 starts the decreasing count from the time T32 according to the digital clock signal DCLK, and accordingly the cycle count signal PCNT start to be decreased.

If the cycle count signal PCNT arrives at 0 as the reference count value at the time T33, the NOR gate 272 outputs the high level. Accordingly, the SR latch 260 generates the duty signal Vduty" of the low level.

A configuration controlling the duty signal for the switching frequency to not be over the limit frequency may be increased in the third exemplary embodiment.

An oscillator 130''' according to the fourth exemplary embodiment uses the digital clock signal while providing the duty balance such that the duty signal is controlled for the switching frequency to not be over the limit frequency.

Hereafter, an oscillator 130''' and an operation according to the fourth exemplary embodiment will be described with reference to FIG. 9 to FIG. 11.

Figure 9:
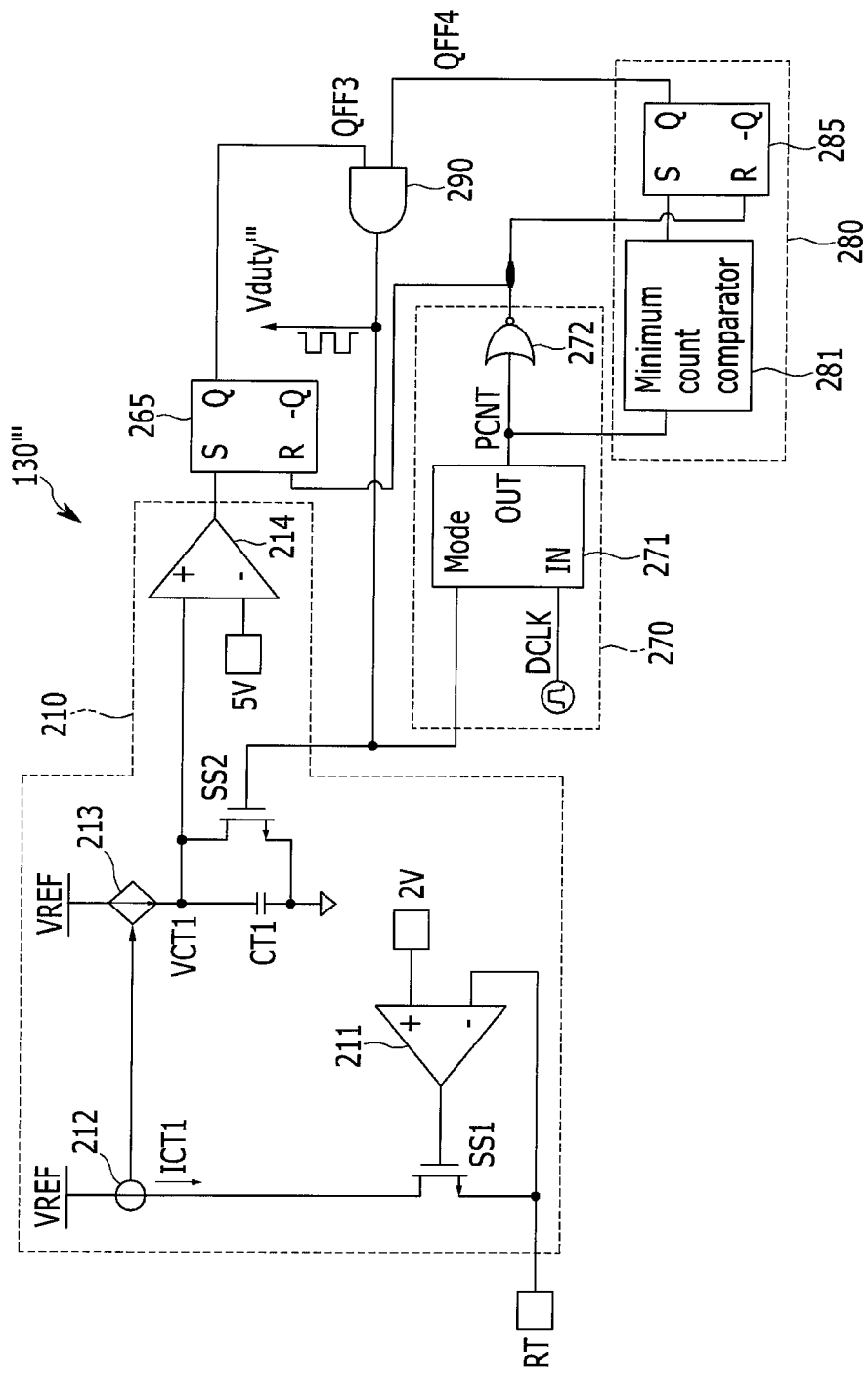
FIG. 9 is a view of an oscillator according to the fourth exemplary embodiment.

FIG. 9 is a view showing an oscillator according to the fourth exemplary embodiment.

The oscillator 130''' includes a frequency determining unit 210, a duty balancing circuit 270, and an SR latch 265, and further includes a frequency restriction unit 280 compared with the oscillator 130" according to the third exemplary embodiment. The output of the frequency restriction unit 280 is further increased such that the fourth exemplary embodiment further includes an AND gate 290.

The frequency determining unit 210 has the same function and structure as the previous exemplary embodiments such that it is indicated by the same reference numeral and the description thereof is omitted. Among the configurations of the duty balancing circuit 270, the same counter 271 and NOR gate 272 as the duty balancing circuit 270 of the third exemplary embodiment are indicated by the same reference numerals, and the description thereof is omitted.

The SR latch 265 generates the duty control signal QFF3 according to the output of the frequency determining unit 210 and the output of the duty balancing circuit 270. The SR latch 265 generates the duty control signal QFF3 of the high level when the output of the frequency determining unit 210 input to the set terminal S is the high level, and generates the duty control signal QFF3 of the low level when the output of the duty balancing circuit 270 input to the reset terminal R is the high level.

The oscillator 130" determines the half cycle corresponding to the limit frequency as the first half cycle by using the output of the cycle count signal PCNT and the duty balancing circuit 270 when the first half cycle is shorter than the half cycle of the threshold cycle. The oscillator 130''' further includes a frequency restriction unit 280 for this.

In detail, the frequency restriction unit 280 generates and outputs the duty control signal QFF4 following the threshold cycle and made of the duty balance by using the output of the cycle count signal PCNT and the duty balancing circuit 270.

The frequency restriction unit 280 includes a minimum count comparison unit 281 and an SR latch 285. The minimum count comparison unit 281 compares the cycle count signal PCNT and the minimum count mcnt (referring to FIG. 10 and FIG. 11) corresponding to the half cycle of the threshold cycle. The minimum count comparison unit 281 outputs the signal of the low level if the cycle count signal PCNT is less than the minimum count mcnt, and outputs the signal of the high level if the cycle count signal PCNT is more than the minimum count mcnt.

The SR latch 285 generates the duty control signal QFF4 according to the output of the minimum count comparison unit 281 and the output of the duty balancing circuit 270. When the output of the minimum count comparison unit 281 input to the set terminal S is the high level, the SR latch 285 generates the duty control signal QFF4 of the high level, and generates the duty control signal QFF4 of the low level when the output of the duty balancing circuit 270 input to the reset terminal R is the high level.

The AND gate 290 generates the duty signal Vduty''' through logic multiple calculation of the duty control signal QFF3 and the duty control signal QFF4.

When the switching frequency is less than the limit frequency, the cycle count signal PCNT is a value that is larger than the minimum count mcnt within the first half cycle period such that the duty of the duty control signal QFF4 is wider than the duty of the duty control signal QFF3. Accordingly, the duty signal Vduty''' is equal to the duty control signal QFF3.

However, when the switching frequency is more than the limit frequency, the cycle count signal PCNT does not arrive at the minimum count mcnt in the first half cycle period such that the duty of the duty control signal QFF3 is wider than the duty of the duty control signal QFF4. Accordingly, the duty signal Vduty''' is equal to the duty control signal QFF4.

Hereafter, the operation and the duty signal Vduty''' of the oscillator 130''' including the frequency restriction unit 280 will be described with reference to FIG. 10 and FIG. 11.

Figure 10:
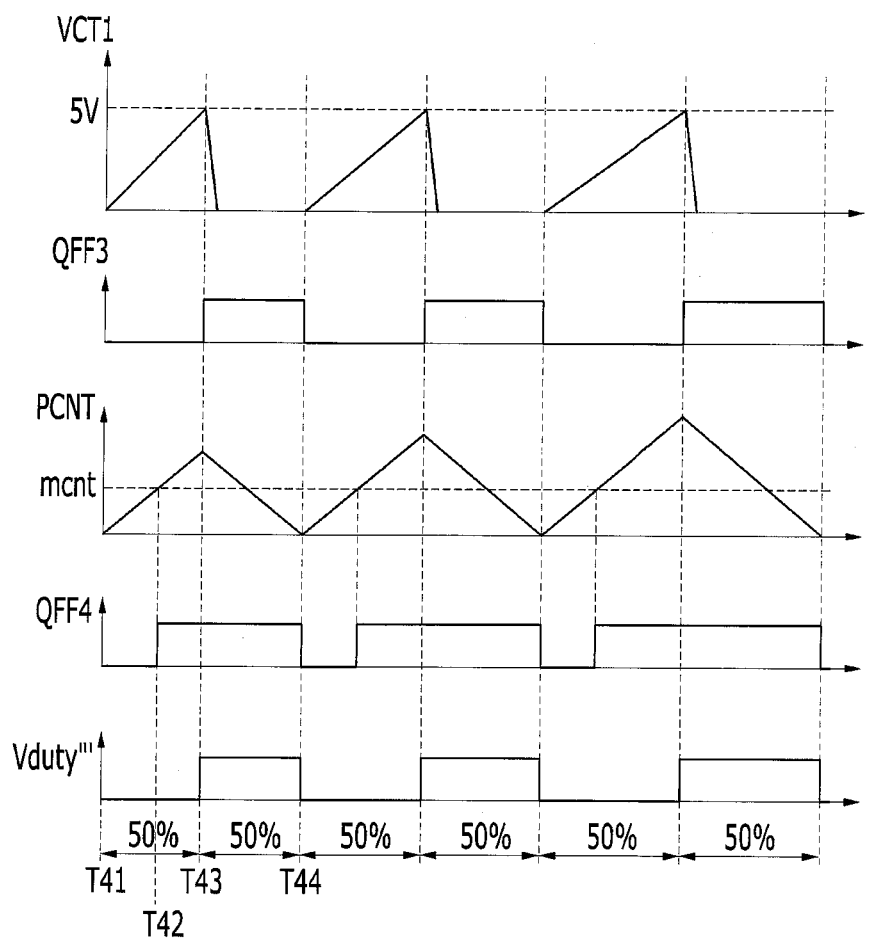
FIG. 10 is a view showing a duty signal generated from an oscillator according to the fourth exemplary embodiment, when a switching frequency is lower than a limit frequency.

FIG. 10 is a view showing a duty signal generated from an oscillator according to the fourth exemplary embodiment, when a switching frequency is lower than a limit frequency.

Figure 11:
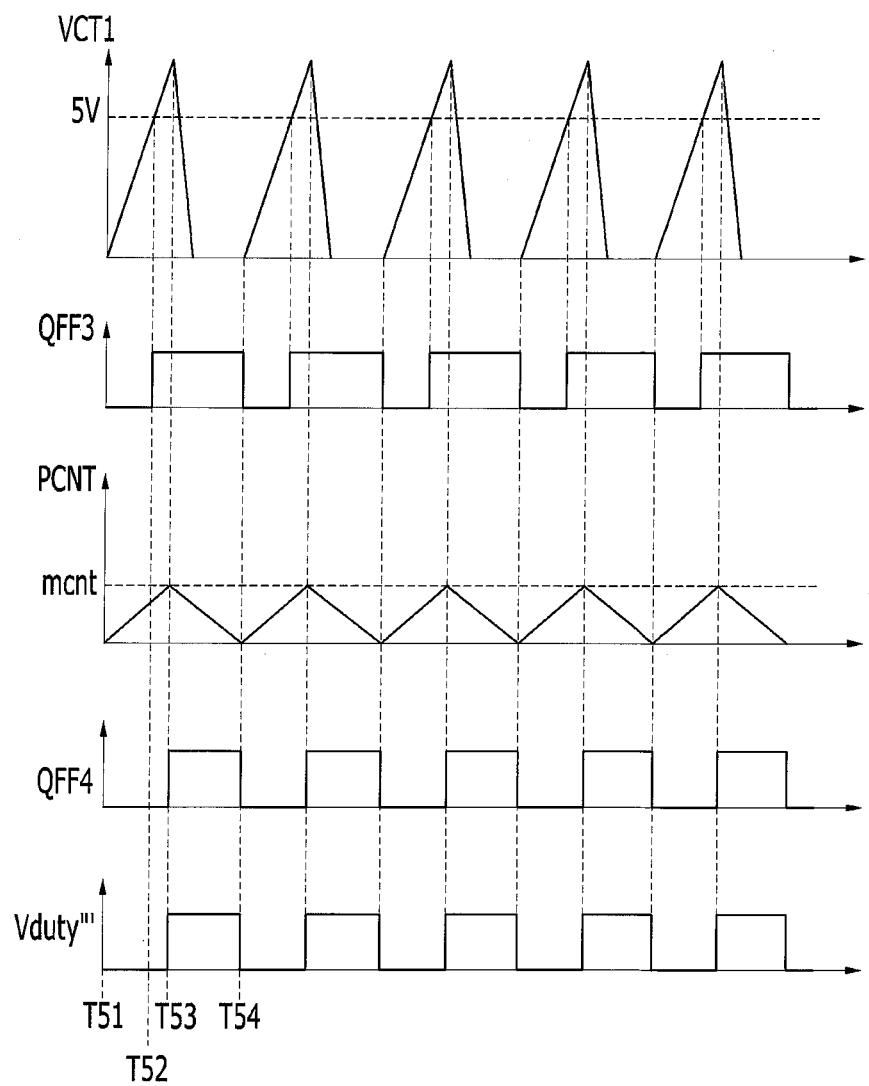
FIG. 11 is a view showing a duty signal generated from an oscillator according to the fourth exemplary embodiment, when a switching frequency is higher than a limit frequency.

FIG. 11 is a view showing a duty signal generated from an oscillator according to the fourth exemplary embodiment, when a switching frequency is higher than a limit frequency.

In FIG. 10 and FIG. 11, the cycle count signal PCNT is continuously increased or decrease, however this is only to explain the exemplary embodiment, and the cycle count signal PCNT is the digital signal. The cycle count signal PCNT is the digital value of N bits that are increased or decreased according to the digital clock signal DCLK. However, in FIG. 10 and FIG. 11, to quantitatively represent the value of the cycle count signal PCNT, it is continuously increased or decreased.

As shown in FIG. 10, the setting control voltage VCT1 starts to be increased by the reference current ICT1 at the time T41, and the cycle count signal PCNT starts to be increased according to the digital clock signal DCLK.

If the cycle count signal PCNT arrives at the minimum count mcnt at the time T42, the output of the minimum count comparison unit 281 is increased to the high level, and the SR latch 285 generates the duty control signal QFF4 of the high level.

If the setting control voltage VCT1 arrives at the reference voltage of 5V at the time T43, the SR latch 265 generates the duty control signal QFF3 of the high level. Thus, the duty signal Vduty''' becomes the high level from the time T43, and the period T41-T43 is set as the first half cycle.

The duty signal Vduty''' is the high level from the time T43 such that the setting control voltage VCT1 is quickly decreased by the turn-on of the switch SS2, and the cycle count signal PCNT is decreased according to the digital clock signal DCLK.

If the cycle count signal PCNT arrives at the reference count value at the time T44, the output of the duty balancing circuit 270 becomes the high level such that the SR latch 285 generates the duty control signal QFF4 of the low level. The SR latch 265 generates the duty control signal QFF3 of the low level according to the output of the duty balancing circuit 270 of the high level.

The duty signal Vduty''' becomes the low level by the duty control signal QFF3 and the duty control signal QFF4 at the time T44.

As described above, when the switching frequency is less than the limit frequency, the duty of the duty control signal QFF3 is less than the duty of the duty control signal QFF4 such that the duty signal Vduty''' is equal to the duty control signal QFF3.

Referring to FIG. 11, for when the switching frequency is more than the limit frequency, the duty signal Vduty''' will be described.

As shown in FIG. 11, the setting control voltage VCT1 starts to be increased by the reference current ICT1 at the time T51, and the cycle count signal PCNT starts to be increased according to the digital clock signal DCLK.

If the setting control voltage VCT1 arrives at the reference voltage of 5V at the time T52, the SR latch 265 generates the duty control signal QFF3 of the high level.

If the cycle count signal PCNT arrives at the minimum count ment at the time T53, the output of the minimum count comparison unit 281 is increased to the high level, and the SR latch 285 generates the duty control signal QFF4 of the high level.

Thus, the duty signal Vduty''' becomes the high level from the time T53, and the period T51-T53 is set as the first half cycle.

The duty signal Vduty''' is the high level from the time T53 such that the setting control voltage VCT1 is quickly decreased by the turn-on of the switch SS2, and the cycle count signal PCNT is decreased according to the digital clock signal DCLK.

If the cycle count signal PCNT arrives at the reference count value at the time T54, the output of the duty balancing circuit 270 is the high level such that the SR latch 285 generates the duty control signal QFF4 of the low level. The SR latch 265 generates the duty control signal QFF3 of the low level according to the high level of the output duty balancing circuit 270.

The duty signal Vduty''' becomes the low level by the duty control signal QFF3 and the duty control signal QFF4 at the time T54.

As described above, when the switching frequency is more than the limit frequency, the duty of the duty control signal QFF4 is less than the duty of the duty control signal QFF3 such duty signal Vduty''' is the same as the duty control signal QFF4.

The cycle count signal PCNT is increased according to the digital clock signal DCLK from the reference count value during the first half cycle. The period in which the cycle count signal PCNT arrives at the reference count value according to the digital clock signal DCLK after the first half cycle is determined as the second half cycle such that the first half cycle and the second half cycle are equal to each other. Accordingly, the duty balance may be realized.

Figure 12:
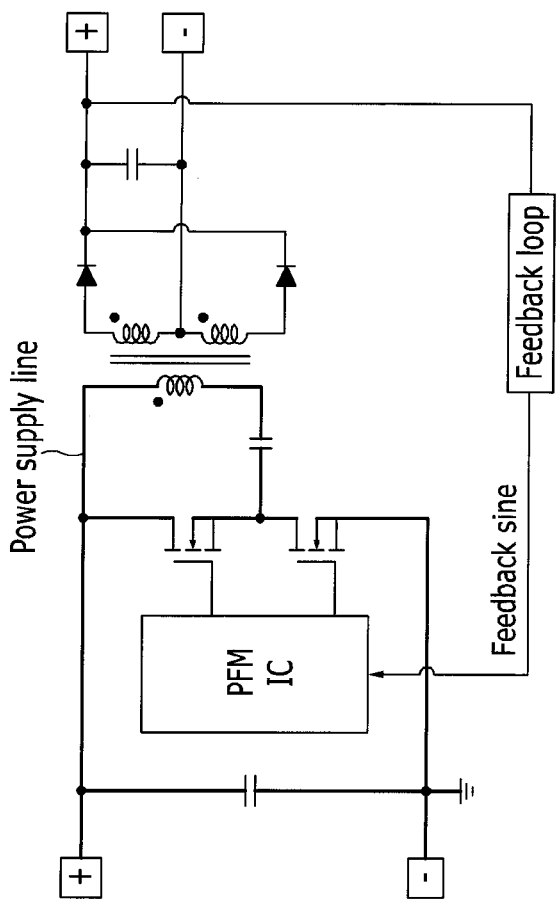
FIG. 12 is a view showing a general LLC converter.

FIG. 12 is a view of a general LLC converter.

In FIG. 12, a noise generated in the power supply line and indicated by the thick line generates the noise to the feedback signal that is input to the PFM IC through a feedback loop. If the noise is generated to the feedback signal, a duty imbalance is generated.

According to an exemplary embodiment, even if the noise is generated to the power supply line, the second half cycle that is equal to the first half cycle is generated such that the duty balance is realized.

The drawings and the detailed description described above are examples for the present invention and provided to explain the present invention and the scope of the present invention described in the claims is not limited thereto. Therefore, it will be appreciated by those skilled in the art that various modifications may be made and other equivalent embodiments are available. Accordingly, the actual scope of the present invention must be determined by the spirit of the appended claims.

DESCRIPTION OF SYMBOLS resonant converter 1, high side switch M1, low side switch M2
pulse frequency modulator 100, feedback loop 200, transformer 300
diode D1 and D2, primary coil Co1, secondary coil Co21 and Co22
capacitor (CIN), setting capacitor CT1, balance capacitor CT2
first gate driver 110, second gate driver 120, oscillator 130
frequency determining unit 210, duty balancing circuit 220 and 270
SR latch 230, 235, 245, 260, 265, 285, error amplifier 211
current mirror 212, dependant current source 213, switch SS1 and SS2
setting comparator 214, charging current source 221
discharging current source 222, discharging switch DS
balance comparator 223, frequency restriction unit 240 and 280
comparator 241, AND gate 250 and 290
counter 271, NOR gate 272, minimum count comparison unit 281
duty control signal QFF1, QFF2, QFF3, QFF4
duty signal Vduty, Vduty', Vduty'', Vduty'''

What is claimed is:

1. An oscillator determining a switching frequency of a converter converting an input voltage according to a switching operation of switches to generate an output voltage, comprising:
   a frequency setting unit determining a first half cycle of a duty signal determining the switching frequency by using a reference current according to a feedback signal corresponding to the output voltage; and
   a duty balancing circuit sensing a first half cycle period by using an output of the frequency setting unit, and determining the same period as the first half cycle as a second half cycle of the duty signal after the first half cycle.

2. The oscillator of claim 1, wherein
the duty balancing circuit determines the second half cycle of the duty signal by decreasing the balance control voltage that is increased with a constant slope during the first half cycle with the same slope as the increasing slope after the first half cycle.

3. The oscillator of claim 2, wherein
the duty balancing circuit includes a balance capacitor that is charged by the charging current during the first half cycle and is discharged to the same current as the charging current during the second half cycle,
the voltage charged to the capacitor is the balance control voltage, and
the duty balancing circuit compares the balance control voltage with the minimum reference voltage after the first half cycle to determine the second half cycle.

4. The oscillator of claim 3, wherein
the second half cycle is the period to the time that the balance control voltage is decreased to the minimum reference voltage after the first half cycle period.

5. The oscillator of claim 3, wherein
the duty balancing circuit includes:
a charging current source charging the balance capacitor during the first half cycle;
a discharging current source discharging the balance capacitor after the first half cycle; and
a balance comparator comparing the balance control voltage and the minimum reference voltage.

6. The oscillator of claim 1, wherein
the frequency setting unit generates a setting control voltage that is increased according to the reference current and sets as the first half cycle from the time that the setting control voltage starts to be increased to the time that the setting control voltage arrives at the peak reference voltage.

7. The oscillator of claim 6, wherein
the frequency setting unit includes:
a predetermined capacitor charged by the reference current; and
a setting comparator comparing the voltage charged to the capacitor and the peak reference voltage, and
the voltage charged to the capacitor is the setting control voltage.

8. The oscillator of claim 1, wherein
the oscillator further includes
an SR latch including the first input terminal input with the output of the frequency setting unit, the second input terminal input with the output of the duty balancing circuit, and the output terminal outputting the duty signal, and
the SR latch changes the level of the duty signal in synchronization with the first input terminal signal and the level of the duty signal in synchronization with the signal level of the second input terminal.

9. The oscillator of claim 8, wherein
the duty balancing circuit includes:
a balance capacitor charged by the charging current during the first half cycle and discharged to the same current as the charging current in the second half cycle;
a charging current source charging the balance capacitor during the first half cycle;
a discharging current source discharging the balance capacitor after the first half cycle; and
a balance comparator comparing the balance control voltage and the minimum reference voltage and comprising the output terminal connected to the second input terminal of the SR latch,
wherein the duty balancing circuit compares the balance control voltage with the minimum reference voltage after the first half cycle to determine the second half cycle.

10. The oscillator of claim 9, wherein
the second half cycle is a period from the first half cycle to the time that the balance control voltage is decreased to the minimum reference voltage.

11. The oscillator of claim 9, wherein
the frequency setting unit includes:
a predetermined capacitor charged by a reference current; and
a setting comparator comparing the voltage charged to the capacitor and the peak reference voltage and having the output terminal connected to the first input terminal of the SR latch, and
the voltage charged to the capacitor is the setting control voltage.

12. The oscillator of claim 1, wherein
when the first half cycle is shorter than the half cycle of the threshold cycle corresponding to the limit frequency, the half cycle corresponding to the limit frequency is determined as the first half cycle.

13. The oscillator of claim 12, wherein
the duty balancing circuit decreases the balance control voltage that is increased with a constant slope during the first half cycle with the same slope as the increasing slope after the first half cycle to generate the output determining the second half cycle of the duty signal.

14. The oscillator of claim 13, wherein
the oscillator further includes
a frequency restriction unit generating the first duty control signal made with a duty balance according to the threshold cycle by using the output of the duty balancing circuit and the balance control voltage.

15. The oscillator of claim 14, wherein
the frequency restriction unit includes:
a restriction comparator comparing a balance control voltage and a threshold reference voltage determining the half cycle of the threshold cycle; and
a first SR latch including the first input terminal input with the output of the restriction comparator, the second input terminal input with the output of the duty balancing circuit, and the output terminal outputting the duty control signal,
wherein the first SR latch generates the first duty control signal determining the first half cycle according to the output of the restriction comparator, and generates the first duty control signal determining the second half cycle according to the output of the duty balancing circuit.

16. The oscillator of claim 15, wherein
the frequency setting unit includes:
a predetermined capacitor charged by the reference current; and
a setting comparator comparing the voltage charged to the capacitor and the peak reference voltage,
the duty balancing circuit includes:
a balance capacitor charged by the charging current during the first half cycle and discharged to the same current as the charging current during the second half cycle; and
a balance comparator comparing a voltage charted to the balance capacitor and a minimum reference voltage to generate the output of the duty balancing circuit,
the oscillator further includes
a second SR latch including the first input terminal input with the output of the setting comparator, the second input terminal input with the output of the duty balancing circuit, and the output terminal outputting the second duty control signal, and the second SR latch changes the level of the second duty control signal in synchronization with the level of the first input terminal signal and the level of the second duty signal in synchronization with the level of the second input terminal signal.

17. The oscillator of claim 16, wherein
the oscillator further includes
a logic calculator outputting a signal having a shorter duty among the first duty control signal and the second duty control signal as the duty signal.

18. The oscillator of claim 1, wherein
the duty balancing circuit generates the output determining the period from the first half cycle to the time that the cycle count signal arrives at the reference count value as the second half cycle if the cycle count signal is increased according to a digital clock signal from the reference count value during the first half cycle and is decreased according to the cycle count signal counted during the first half cycle after the first half cycle according to the digital clock signal such that the cycle count signal arrives at the reference count value.

19. The oscillator of claim 18, wherein
the duty balancing circuit further includes:
a counter determining one of an increasing count mode and a decreasing count mode according to the duty signal and increasing or decreasing the cycle count signal according to the digital clock signal according to the determined mode; and
a logic calculator receiving the cycle count signal and determining whether the cycle count signal arrives at the reference count value to generate the output of the duty balancing circuit.

20. The oscillator of claim 19, wherein
the oscillator further includes
an SR latch including the first input terminal input with the output of the frequency setting unit, the second input terminal input with the output of the duty balancing circuit, and the output terminal outputting the duty signal, and
the SR latch changes the level of the duty signal in synchronization with the level of the first input terminal signal and the level of the duty signal in synchronization with the level of the second input terminal signal.

21. The oscillator of claim 18, wherein
when the first half cycle is shorter than the half cycle of the threshold cycle corresponding to the limit frequency, the half cycle corresponding to the limit frequency is determined as the first half cycle.

22. The oscillator of claim 21, wherein
the oscillator further includes
a frequency restriction unit generating the first duty control signal made with a duty balance according to the threshold cycle by using the output of the duty balancing circuit and the balance control voltage.

23. The oscillator of claim 22, wherein
the frequency restriction unit includes:
a minimum count comparison unit generating the cycle count signal and the output according to the comparing result of the minimum count corresponding to the half cycle of the threshold cycle; and
a first SR latch including a first input terminal input with the output of the minimum count comparison unit, a second input terminal input with the output of the duty balancing circuit, and an output terminal outputting the first duty control signal, and
the first SR latch generates the first duty control signal determining the first half cycle according to the output of the minimum count comparison unit and the first duty control signal determining the second half cycle according to the duty balancing circuit.

24. The oscillator of claim 23, wherein
the oscillator further includes
a second SR latch including the first input terminal input with the output of the frequency setting unit, the second input terminal input with the output of the duty balancing circuit, and the output terminal outputting the second duty control signal,
wherein the second SR latch changes the level of the second duty control signal in synchronization with the level of the first input terminal signal and the level of the second duty control signal in synchronization with the level of the second input terminal signal.

25. The oscillator of claim 24, wherein
the oscillator further includes
a logic calculator outputting a signal having a shorter duty among the first duty control signal and the second duty control signal as the duty signal.

* * * * *